United States Patent
Zemmrich et al.

(10) Patent No.: US 12,337,769 B2
(45) Date of Patent: Jun. 24, 2025

(54) CONTROL UNIT FOR A VEHICLE INTERIOR AND METHOD FOR PRODUCING THE CONTROL UNIT

(71) Applicant: Faurecia Innenraum Systeme GmbH, Hagenbach (DE)

(72) Inventors: René Zemmrich, Hagenbach (DE); Raquel Machado, L'Isle Adam (FR)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 574 days.

(21) Appl. No.: 17/648,060

(22) Filed: Jan. 14, 2022

(65) Prior Publication Data

US 2022/0227312 A1    Jul. 21, 2022

(30) Foreign Application Priority Data

Jan. 15, 2021 (DE) ...................... 10 2021 200 335.4

(51) Int. Cl.
*B60R 13/02* (2006.01)
*B41F 15/14* (2006.01)
(Continued)

(52) U.S. Cl.
CPC ............. *B60R 13/02* (2013.01); *B41F 15/14* (2013.01); *B41M 3/00* (2013.01); *B60Q 3/80* (2017.02); *G09F 13/044* (2021.05)

(58) Field of Classification Search
CPC .......... B41M 3/00; B60K 2360/20–48; B60K 2360/60–62; B60K 2360/92–96; B60K 2360/11–149; B60K 2360/339; B60K 2360/34; B60K 2360/345; B60K 35/10; B60K 35/20; G09F 21/049; G09F 13/044; G09F 13/06; G09F 13/08; G06F 13/06; (Continued)

(56) References Cited

U.S. PATENT DOCUMENTS 10,906,476 B2   2/2021   Preisler et al.
12,005,835 B2   6/2024   Basquin et al.
(Continued)

FOREIGN PATENT DOCUMENTS

CN   207481800   6/2018
DE   19717636 A1   11/1998
(Continued)

OTHER PUBLICATIONS

"U.S. Appl. No. 17/648,064, Notice of Allowance mailed Apr. 1, 2024", 10 pgs.
(Continued)

*Primary Examiner* — Nitin Patel
*Assistant Examiner* — Amen W Bogale
(74) *Attorney, Agent, or Firm* — Schwegman Lundberg & Woessner, P.A.

(57) ABSTRACT

The present disclosure relates to a control unit for a vehicle interior. In particular, the control unit can comprise an information region with symbols, wherein some symbols are always visible and some symbols are only visible when they are back lit. The application also relates to a method for producing a corresponding control unit. The control unit can be part of a vehicle interior trim part, for example part of an instrument panel, door trim or center console.

18 Claims, 5 Drawing Sheets

(51) Int. Cl.
  *B41M 3/00* (2006.01)
  *B60Q 3/80* (2017.01)
  *G09F 13/04* (2006.01)

(58) Field of Classification Search
  CPC ......... G06F 13/08; G06F 13/10; B60R 13/02; B60R 2013/0287; B41F 15/14; B60Q 3/80; B60Q 3/14; B60Q 3/54; B60Q 3/82; B60Q 3/20; B60Q 3/64; B60Q 3/74; B32B 27/00; B32B 27/06; B32B 3/266; B32B 3/30; B32B 3/26
  See application file for complete search history.

(56) References Cited

U.S. PATENT DOCUMENTS

| | | | |
|---|---|---|---|
| 2004/0017687 A1 | 1/2004 | Misaras | |
| 2009/0258221 A1 | 10/2009 | Diehl et al. | |
| 2010/0261036 A1 | 10/2010 | Calcagni et al. | |
| 2010/0277946 A1 | 11/2010 | Shallcross et al. | |
| 2012/0142509 A1* | 6/2012 | Sugai | B60K 35/53 493/324 |
| 2012/0257376 A1* | 10/2012 | Zhou | G02B 5/045 362/97.1 |
| 2018/0111548 A1* | 4/2018 | Koga | F21V 11/00 |
| 2018/0111569 A1* | 4/2018 | Faik | B60R 13/02 |
| 2018/0204493 A1* | 7/2018 | Sakamaki | B60K 35/00 |
| 2018/0281701 A1 | 10/2018 | Preisler et al. | |
| 2019/0025954 A1* | 1/2019 | Wang | G06F 3/041 |
| 2019/0285467 A1* | 9/2019 | Chen | B23P 19/04 |
| 2020/0039431 A1* | 2/2020 | Haas | B60Q 3/12 |
| 2020/0139595 A1* | 5/2020 | Kim | B32B 5/02 |
| 2021/0300265 A1* | 9/2021 | Piccin | B32B 9/007 |
| 2022/0060036 A1* | 2/2022 | Piccin | H02J 7/02 |
| 2022/0227292 A1* | 7/2022 | Basquin | B60Q 3/54 |
| 2023/0213173 A1* | 7/2023 | Chang | H10K 50/865 |
| 2023/0326378 A1* | 10/2023 | Hosokawa | B32B 3/266 40/564 |

FOREIGN PATENT DOCUMENTS

| | | |
|---|---|---|
| DE | 102007054348 A1 | 5/2009 |
| DE | 102008054721 B3 | 4/2010 |
| DE | 102009007336 A1 | 9/2010 |
| DE | 102015120120 A1 | 5/2017 |
| DE | 102016211074 A1 | 12/2017 |
| DE | 102016214806 A1 | 2/2018 |
| DE | 102016217949 A1 | 3/2018 |
| DE | 102016218916 A1 | 3/2018 |
| DE | 102016219288 A1 | 4/2018 |
| DE | 102016225413 | 7/2018 |
| DE | 102017115304 A1 | 1/2019 |
| DE | 102018124893 A1 | 4/2020 |
| EP | 2060443 | 5/2009 |
| EP | 2218610 | 8/2010 |

OTHER PUBLICATIONS

"German Application Serial No. 102021200379.6, Search Report dated Nov. 10, 2021", (Nov. 10, 2021), 8 pgs.

U.S. Appl. No. 17/648,064, filed Jan. 14, 2022, Perforated Vehicle Interior Trim Part.

* cited by examiner

CONTROL UNIT FOR A VEHICLE INTERIOR AND METHOD FOR PRODUCING THE CONTROL UNIT

CLAIM FOR PRIORITY

This application claims the benefit of priority of German Application No. 10 2021 200 335.4, filed Jan. 15, 2021, which is hereby incorporated by reference in its entirety.

TECHNICAL FIELD

The present application relates to a control unit for a vehicle interior. In particular, the control unit can comprise an information region with symbols, wherein some symbols are always visible and some symbols are only visible when they are back lit. The application also relates to a method for producing a corresponding control unit. The control unit can be part of a vehicle interior trim part, for example part of an instrument panel, door trim or center console.

BACKGROUND

When designing a vehicle interior, greater aesthetic as well as safety-relevant requirements are increasingly being placed on the vehicle interior. For example, in some jurisdictions it is a legal requirement that some symbols which are relevant for vehicle safety (e.g., the symbol which indicates a hazard warning light) must always be visible to an occupant. By contrast, the design of a vehicle interior is increasingly subject to the aesthetic requirement that surfaces comprise as few uneven surfaces, edges or visual distractions as possible.

SUMMARY/OVERVIEW

It can thus be desirable to create a component which, when it is not back lit, comprises both visible and also non-visible symbols. In particular, safety-relevant symbols can be visible, whereas non-safety-relevant symbols, if not activated, can disappear on a visible side. In particular, it may be desirable that regions with visible and non-visible symbols cannot be distinguished from a visible side of the component and/or the surfaces surrounding the symbols preferably have the same outward appearance.

The object of the present disclosure is therefore to create an alternative control unit which preferably has an improved aesthetic. In particular, an object of the present disclosure is to propose a control unit which comprises symbols which are only visible when back lit and which also comprises symbols which are also visible when they are not back lit. A further object of the present disclosure can lie in proposing an alternative and/or improved production method for producing a corresponding control unit.

The proposed control unit can typically have a layered structure, i.e., can be formed by a plurality of material layers arranged one above the other.

The control unit comprises a transparent cover layer, an opaque mask layer, and a translucent decorative layer arranged between the cover layer and the mask layer.

In the present context, transparency is understood to mean an optical property of a material. If a material is transparent for incident electromagnetic radiation, in particular photons, of a broader or narrower frequency spectrum, this radiation can pass through the material almost fully, therefore is hardly reflected and hardly absorbed. In particular, an object arranged behind a transparent material can be seen through said material. A transparent material can be colorless or colored. The transparent cover layer can thus be passed through by light, preferably almost fully. The cover layer is typically largely permeable in particular for radiation in the visible spectrum, that is to say in particular for radiation between approximately 380 nm and 780 nm.

In the present context, a partial permeability to light can be understood by the term translucency. Light can pass through a translucent material, however, the light is scattered, so that objects covered by the material can appear blurred or might not be visible at all. The translucency of plastic parts can be dependent on the processed polymer, any additives and the surface structure. The decorative layer can be translucent and thus in particular not fully light-permeable. A translucent material can be colorless or colored.

The term opacity can be understood to mean that a material is substantially impermeable to light and opaque. The transmittance of an opaque material, for example an opaque plastic, approaches zero. The mask layer is typically substantially impermeable to light. A mask layer can comprise transparent or translucent regions, for example open perforated regions or perforated regions filled by transparent or translucent material.

The control unit typically has a visible side and a rear side. The cover layer is typically arranged on the visible side. If the control unit is arranged in a vehicle interior, the control unit is typically oriented in such a way that the visible side points toward the vehicle interior and the rear side points away from it. A vehicle occupant can thus preferably see only the visible side.

The mask layer and the decorative layer each have at least one through-hole in a first region. In particular, the at least one through-hole of the mask layer and/or the at least one through-hole of the decorative layer can be formed and arranged in the first region, in such a way that a symbol is visible on the visible side of the control unit.

The at least one through-hole of the mask layer and the at least one through-hole of the decorative layer are aligned with each other in the first region. This can have the advantage that the symbol of the first region can be visible in the illuminated and non-illuminated state.

In one embodiment, in the first region the through-holes of the mask layer and the through-holes of the decorative layer have the same diameter or the same dimensions in the transverse direction and/or the same cross section. In an alternative embodiment, in the first region the through-holes of the mask layer and the through-holes of the decorative layer have different diameters or different dimensions and/or different shapes in the transverse direction. With a different form of the through-holes, in particular the through-holes of the mask layer can have a greater area than the through-holes of the decorative layer.

In a second region the mask layer has at least one through-hole, which is covered by the decorative layer. The at least one through-hole of the mask layer can be formed and arranged in such a way that a symbol is visible on the visible side of the control unit under backlighting. The symbol which is covered by the decorative layer in particular cannot be visible when it is not back lit.

The first and the second region can in particular be information regions which can provide information—for example for a vehicle occupant. For example, information symbols can be provided, which display vehicle functions. The symbols can be illuminable in order to show that the function associated with the symbol is activated. In particular, the through-holes can be illuminated from a rear side of the control unit, so that the light passes through the through-holes in the direction of the visible side and the contour of the through-holes is visible on the visible side. The light in particular cannot pass through the mask layer or can only pass through it to an insignificant extent.

The control unit can comprise illuminates to back light the symbols. The illuminants can be switched on when a function that is displayed by a symbol on the visible side of the control unit is activated. An illuminant can be assigned to a symbol, i.e, a function, and the illuminants can be switched on and/or switched off independently of one another. The function that is activated can thus be displayed on the visible side of the control unit.

The at least one through-hole of the mask layer and/or of the decorative layer can be a plurality of through-holes in each case, for example at least three through-holes, preferably at least five through-holes, particularly preferably at least ten through-holes.

A through-hole can have a form corresponding to a symbol or part of a symbol. For example, a brake warning symbol can comprise a circle and an exclamation mark in the circle, the exclamation mark being formed by line and a dot arranged below the line. A brake warning symbol of this kind could thus comprise three through-holes.

Alternatively, it can be provided that many small through-holes form the corresponding symbol, here for example the brake warning symbol. For example, at least 50, preferably at least 100 through-holes, can be arranged in such a way that they form the symbol. For example, 50 circular through-holes can be provided to form the brake warning symbol, which are arranged in a circle, and ten circular through-holes can be arranged along a line in the circle in such a way that they form an exclamation mark. Of course, some or all through-holes can additionally or alternatively have other forms, for example they can be rectangular, square or elliptical, or can have mixed forms.

The control unit can additionally or alternatively comprise sensors and/or switches for activating and/or deactivating the functions displayed by the symbols. For example, the region in which a symbol is displayed on the visible side can be equipped with a capacitive sensor. For example, it can be provided that touching the cover layer of the control unit where a symbol is displayed triggers an activation of the function associated with the symbol. The function can be deactivated by touching once more. Additionally or alternatively, a controller can be provided so that adjustments can be made, so that, for example, a volume adjustment can be made or a temperature of an air conditioning system can be adjusted. The controller can control settings for example via a pressure sensitivity, for example by means of a pressure sensor, wherein heavier pressing triggers a stronger control. Additionally or alternatively, it can be provided that the touch duration influences the control, for example continuous touching can result in an increase or decrease in a control function.

The control unit can have a third region. The mask layer can have a plurality of through-holes in the third region. In particular, the decorative layer can cover the through-holes in the third region.

The third region can surround the first region and the second region. In particular, the first and the second region can be arranged adjacently, whereas the third region encircles the first and the second region. The control unit can comprise a plurality of first regions and a plurality of second regions. In particular, the first and second regions can be enclosed by the third region. The third region can perform a decorative function, for example an indirect lighting, in particular an ambient lighting. Illuminants can be provided for this purpose on the rear side of the control unit in the third region, from which illuminants light passes through the through-holes of the mask layer in the direction of the visible layer when said illuminants are switched on. The light could pass through the translucent decorative layer and could be scattered.

In one exemplary embodiment, a diameter of the through-holes in the mask layer in the first and/or second region can preferably be greater than a minimal diameter of the through-holes in the mask layer in the third region. An optical "line", by means of which a symbol can be optically "drawn" in the first or second region can be thinner than the diameter of a through-hole in the third region.

In one exemplary embodiment, the area ratio of the mask layer area to the area of the through-holes in the third region is smaller than the area ratio of the mask layer area to the area of the through-holes in the first region. In the third region, the mask layer preferably has smaller through-holes than the through-holes in the mask layer in the first and/or second region. The through-holes of the mask layer in the third region can be formed by screen printing, whereas the through-holes in the first and/or second region are preferably formed by means of laser erosion. Sharper and more accurately positioned edges can be created with a laser.

The through-holes in the mask layer in the third region can have the same distance to adjacent through-holes in the same region. The third region can thus have a uniform appearance on a visible side of the control unit, in particular when back lit.

In one embodiment, the at least one through-hole of the mask layer can be formed in the first region and/or second region by laser erosion, and/or the at least one through-hole of the mask layer can be formed in the third region by screen printing.

In one exemplary embodiment, the transparent cover layer can comprise a plurality of layers. In particular, the transparent cover layer can comprise a foil layer and/or a carrier layer and/or a protective layer.

If all of these three layers are provided, the carrier layer is typically arranged between the foil layer and the protective layer. The protective layer then typically points toward the visible side, whereas the foil layer points toward the decorative layer. Alternatively, only some or only one of these layers can be provided. In particular, only the foil layer can be provided and/or only the foil layer and the carrier layer.

The foil layer can have a thickness of at least 0.1 mm, preferably at least 0.2 mm. The foil layer can have a thickness of at most 2 mm, preferably at most 1.5 mm. The foil layer can comprise polycarbonate (PC), polymethylmethacrylate (PMMA), polyesters such as polyethyleneterephthalate (PET) or amorphous polyamides. The foil layer can serve as a carrier of the decorative layer and/or as a protective layer for the decorative layer. The protective layer can be thermally reshaped and/or reshaped under pressure. The foil layer, in particular in the form of a PC foil, can be suitable for the thermoforming method and/or high-pressure forming (HPF) and the in-mold labeling (IML)/film insert molding (FIM) process. An adhesion promoter layer can be applied in order to ensure the adhesion in IML/FIM. Alternatively, the decorative layer can be transferred by means of a transfer foil, which in particular is not part of the control unit, in the in-mold decoration (IMD) method.

The carrier layer can have a thickness of at least 0.3 mm, preferably at least 0.4 mm. The carrier layer can have a thickness of at most 10 mm, preferably at most 6 mm. The carrier layer can comprise polycarbonate (PC), polymethylmethacrylate (PMMA), polyesters such as polyethyleneterephthalate (PET) and/or amorphous polyamides. The carrier layer can be sprayed in the form of liquid plastic onto the foil layer and can then cure. The carrier layer can thus stabilize the control unit and can fix a form into which the foil layer can be brought. The carrier layer can assimilate a glass and, by way of a thickness of at least 1 mm, can allow a high-quality depth effect.

The protective layer can have a thickness of at least 0.1 mm, preferably at least 0.2 mm. The protective layer can have a thickness of at most 0.6 mm, preferably at most 0.5 mm. The protective layer can preferably have a strength of approximately 0.6 mm. The protective layer can comprise polyurethane (PU), polyurea (PUA), polysiloxane and/or polyacrylic. The protective layer can be applied, for example, by means of brushes or nozzles.

The protective layer can be sprayed on. The protective layer can be applied by means of reaction injection molding. The protective layer can have an antistatic coating and/or an anti-scratch coating and/or an anti-fingerprint coating.

The decorative layer can comprise a metal layer and/or a tinted color layer.

The metal layer can consist of metal and/or can comprise metal. The metal layer can be, for example, a thin metal layer, in particular can have a thickness of at most 50 nm, preferably at most 100 nm and/or minimally 5 nm, preferably minimally 10 nm.

The metal layer can comprise, for example, aluminum, tin, chromium or indium. The metal layer can be applied by means of PVD (physical vapor deposition) to the cover layer, in particular the foil layer, and/or to the tinted color layer, which can be arranged between the cover layer and the metal layer.

The metal layer can alternatively merely be metal-like, for example can have the visual appearance of a metal, but not be a metal in the chemical sense. In particular, the metal layer can be a layer with low electrical conductivity in order to be compatible with capacitive elements, in particular capacitive contact sensors.

In particular, the metal layer can be semi-transparent, or rather translucent, in order to ensure a metallic aspect when the control unit is not back lit. With backlighting, light can pass through the metal layer in order to allow visible symbols.

The tinted color layer can be semi-transparent, that is to say translucent, so that light with which the control unit is back lit can pass through the tinted color layer. Symbols in the second region, when this is back lit, can thus be visible on the visible side. If the second region is not back lit, the symbols behind the tinted color layer and/or the metal layer can disappear.

In the first region, the metal layer and the tinted color layer with the through-holes of the mask layer can have aligned through-holes, as already described above with reference to the decorative layer (which comprises the metal layer and the tinted color layer). The through-holes can be introduced into the metal layer and the tinted color layer by means of laser.

The tinted color layer can allow what is known as a "dark chrome" effect. The tinted color layer can be colored in one color and/or different colors. A metal layer which is arranged beneath as viewed from a visible side can thus be optically colored.

In one embodiment, at least one translucent protective layer can be arranged between the decorative layer and the mask layer in the second region and/or in the third region.

A translucent protective layer of the at least one translucent protective layer, referred to hereinafter as the first translucent protective layer, can have in particular a dark color in order to reduce a visible contrast between the through-holes and the mask layer from the visible side and/or in order to reduce a visibility of the transition between opaque mask layer and decorative layer. The first translucent layer can be applied in particular by means of screen printing methods to the decorative layer, in particular to the metal layer.

In one exemplary embodiment, the control unit comprises, in particular in the second region, a further protective layer, referred to hereinafter as a second translucent protective layer. The second translucent protective layer can in particular be colored lighter than the first translucent protective layer. The second translucent layer can likewise be applied by means of screen printing methods, in particular to the first translucent protective layer. The first and the second translucent protective layer are preferably arranged between the decorative layer and the mask layer in the second region, wherein the first translucent protective layer in particular borders the decorative layer and the second translucent protective layer borders the mask layer.

In an alternative embodiment, the first translucent protective layer can border the mask layer and the second translucent protective layer can border the decorative layer. The first and/or the second translucent protective layer preferably have no through-holes, in particular not in the region of the through-holes in the mask layer.

In one exemplary embodiment, the mask layer is black. Alternatively, the mask layer can have a different color. The mask layer typically has a low electrical conductivity so as not to interfere with the use of capacitive control elements. The mask layer can be applied by screen printing in particular to the decorative layer and/or the translucent protective layer.

The mask layer and the decorative layer can be formed in particular so as to be erodable by laser.

In one embodiment, a diffusor layer and/or a protective layer can be arranged on a rear side of the mask layer facing away from the visible side.

The protective layer can be transparent or translucent and can serve in particular to protect lasered areas and edges and/or to protect the layers arranged thereabove, for example the decorative layer, in particular the metal layer, against ambient influences, for example moisture, acids, oxygen and dirt. The protective layer can be anti-static and/or can be formed as an anti-fingerprint and/or anti-stick and/or anti-scratch coating.

The diffusor layer can be arranged between the protective layer and the mask layer. In particular, the diffusor layer can be applied by means of pad printing. The diffusor layer can be applied in particular in the first region and can have a color, for example red, white or blue. The color of the diffusor layer from the visible side can thus be visible through the through-holes in the first region. The symbols which are always visible can thus have any color. For example, red can be used for a hazard warning light and white for a symbol for door locking/door unlocking, and blue for a symbol for the coolant display.

The present disclosure further relates to a method for producing a control unit for a vehicle according to the above description. The method comprises the following steps:

I. providing a cover layer, in particular comprising a first foil having a front side and a rear side,
 II. printing a translucent decorative layer onto the rear side of the foil, preferably by means of screen printing, III. printing on an opaque mask layer, at least in some regions, preferably by means of screen printing, IV. eroding the mask layer in some regions, preferably by laser erosion, in a first region and in a second region to form through-holes in the mask layer, preferably using a laser, V. eroding the decorative layer in some regions, preferably by laser erosion, in the region of the through-holes of the mask layer in the first region to form corresponding through-holes in the decorative layer.

In particular, the opaque mask layer in method step III is applied across the whole area in the first region and in the second region and is applied in some regions in a third region, so that the mask layer has through-holes in the third region.

In one embodiment of the method, the printed foil can be pre-formed between method steps III and IV or after method step V. A plastic for forming a carrier layer can then be applied to the front side of the printed foil, in particular by back-injection molding of the foil with a liquid plastic. The plastic can then cure.

The above-described order of the method steps is an advantageous order which does not necessarily have to maintained in order to carry out the method according to the disclosure. For example, the method steps can also be performed in a modified order. In particular, a back-injection molding of the foil of the cover layer can be performed after a laser erosion or prior to a laser erosion. Method step V can preferably be performed simultaneously with method step IV, so that in region I the holes in the mask layer and in the decorative layer are formed simultaneously.

Prior to the deformation by thermoforming of the printed foil, the foil can be heated. The deformation can take place additionally or alternatively at elevated pressure (high pressure forming, HPF). The deformed foil can be fixed in the deformed shape by the cooled, back-injection molded plastic.

With a suitable geometry of the control unit, it is also possible to dispense with the reshaping. For example, simple almost flat control units can be produced since the foil is marginally deformed by the energy (pressure/temperature) of the melt during the back-injection molding.

In the first region, a diffusor layer can be printed onto a side of the mask layer facing away from the visible side, preferably by means of pad printing.

A protective layer can be applied in the first region, second region and/or third region on a side of the mask layer facing away from the visible side and/or on a side of the diffusor layer facing away from the visible side, preferably by means of pad printing.

A number of embodiments have been disclosed here. Yet further embodiments of the present disclosure will become evident to a person skilled in the art from the following detailed description, which presents and describes exemplary embodiments of the disclosure. Accordingly, the drawings and the detailed description are considered to be exemplary and non-limiting. Recurrent features are provided with the same reference signs in the description of the figures.

BRIEF DESCRIPTION OF THE FIGURES

In the figures

DETAILED DESCRIPTION

Figure 1:
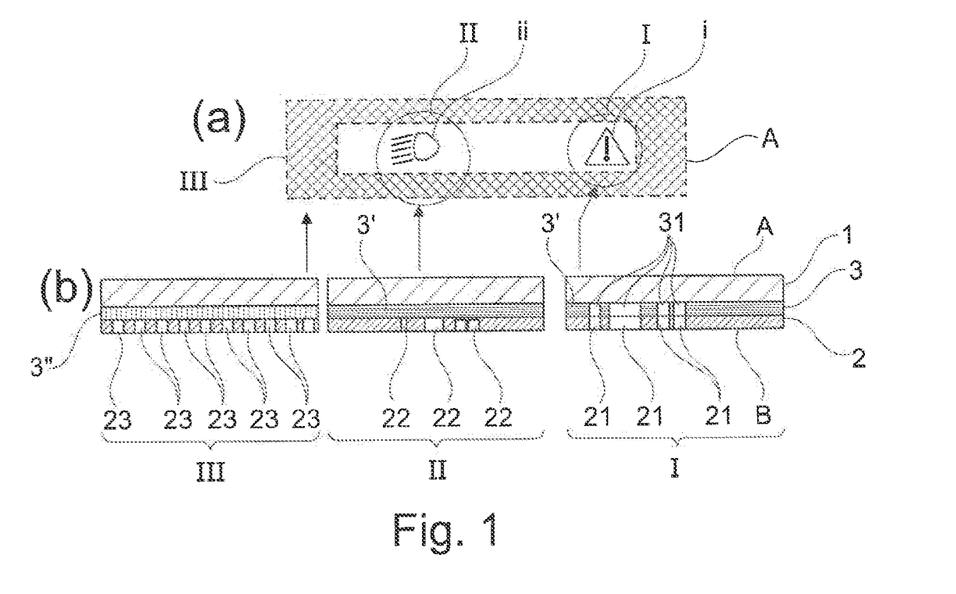
FIG. 1 shows a schematic description of a control unit with a first, a second, and a third region, in a plan view and a schematic sectional view of the three region of the control unit.

FIG. 1 (*a*) shows a schematic depiction of a control unit on a visible side A in a plan view. The control unit has a layered structure, as can be seen in a cross-sectional illustration of FIG. 1 (*b*). The control unit has a mask layer 2, on which there is arranged a decorative layer 3. A cover layer 1 is in turn arranged on the decorative layer 3. The decorative layer 3 is thus arranged between the cover layer 1 and the mask layer 2.

The control unit also has a rear side B. When the control unit is arranged in a vehicle interior, the visible side A points toward the vehicle interior, whereas the rear side B is not visible to a vehicle occupant.

Tye control unit has a first region I, a second region II and a third region III. In the first region I there is arranged a symbol i, which is permanently visible from the visible side. The symbol is formed by through-holes 31 in the decorative layer 3 and through-holes 21 in the mask layer 2. The through-holes 31 and 21 are arranged one above the other and aligned with each other and covered by the cover layer 1. The cover layer 1 is transparent, whereas the decorative layer 3 is translucent and the mask layer 2 is opaque.

In the second region II there is arranged a symbol ii, which is only visible from the visible side when the symbol is back lit. If it is not back lit, it is not visible from the visible side. The symbol ii is formed by through-holes 22 in the mask layer 2. These through-holes 22 are covered by the decorative layer 3 so that the contours of the through-holes 22 are not visible when no illuminant on the rear side B of the control unit in the region of the symbol ii is switched on.

The symbol i or symbol ii can be back lit by an illuminant, for example an LED or an electroluminescence foil, which is arranged on the rear side B of the control unit. At least one illuminant is preferably provided for each symbol i or ii. The illuminants can be switched on and off independently of one another. The symbol i shows a triangle with an exclamation mark therein and is, for example, the symbol of a hazard warning light in a vehicle. When the hazard warning light is switched on, the symbol i is back lit. If the hazard warning light is switched off, the illuminant behind the symbol i is switched off again. Nevertheless, the contour of the symbol can be seen from the visible side.

The symbol ii shows a headlight. If the dipped beam of a vehicle is switched on, the symbol ii is back lit and is visible. If the dipped beam is not switched on, the symbol is not back lit and is not visible from the visible side.

The third region III is characterized in that an ambient light is adjustable. The mask layer 2 of the third region III has through-holes 23 which can also be back lit by illuminants. A decorative layer 3" is arranged between the mask layer 2 and the cover layer 1. The decorative layer 3" preferably corresponds to the decorative layer 3' in the first region I and second region II. In some exemplary embodiments the properties and characteristics of the decorative layer 3' and 3" differ. For example, another color, a different translucency or a different surface appearance or a different material can be selected. For example, the decorative later of the third region can be more permeable to light than the decorative layer 3' of the first region I and second region II. When the third region III is back lit, an indirect light is emitted at the visible side. The light passes through the decorative layer 3" and is scattered. For example, a vehicle interior can thus be illuminated indirectly.

Figure 2:
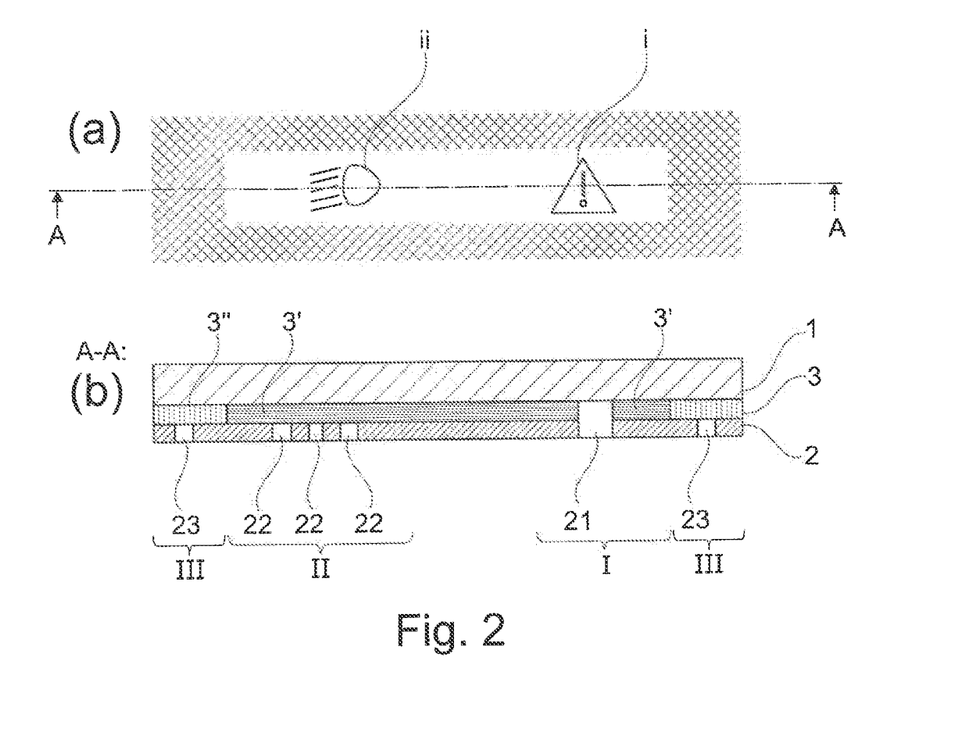
FIG. 2 shows a schematic sectional view of the three regions of the control unit of FIG. 1, and a sectional view of the control unit.

FIG. 2 shows a control element which corresponds substantially to the control element of FIG. 1. The control unit is shown schematically in FIG. 2 (*a*) and in a plan view. In FIG. 2 (*b*) the control unit is shown in a sectional view along the line of section AA shown in FIG. 2 (*a*). It is shown in FIG. 2 (*b*) that the mask layer 2, the decorative layer 3 and the cover layer 1 have the same material thickness and each extend over the entire control unit. Material cut-outs are provided in the region of the above-described through-holes 21, 22, 23. The regions I and II transition fluently into one another and the changes between regions are not visible from the visible side. To this end, the decorative layer 3' in regions I and II are the same, whereas the decorative layer 3" differs from the decorative layer in regions I and II. For example, the decorative layer 3" has a higher translucency. For example, the region III, which displays a lighting function, can be optically separated from regions I and II, which serve as information regions. The third region III surrounds the first region and the second regions I, II. For example, the information of the first and second regions I, II can be highlighted again and an eye of a vehicle occupant can be drawn to these regions I, II and the symbols i, ii, which are partly safety-relevant and are located in said regions.

The cover layer 1 of FIGS. 1 and 2 comprises polycarbonate and is transparent. The decorative layer 3' is made of aluminum and is applied to the decorative layer 1 by physical vapor deposition. The decorative layer 3' is made of tin and is applied to the decorative layer 1 by physical vapor deposition. The mask layer 2 comprises the substance mixtures, conventional for screen printing, of dyes, solvents and binders which are applied as emulsion, dispersion or plastisol. The polymer base can comprise polyurethane, polyester, acrylic or acrylate. The mask layer 2 is printed onto the decorative layer 3 by means of screen printing. The mask layer 2 is applied to the decorative layer 3' in the first and second region across the whole area, whereas the mask layer 2 is printed onto the decorative layer 3" with cut-outs so that the mask layer 2 has through-openings in the third region. The mask layer 2 can be eroded by laser. In the first region I, the mask layer 2 has been eroded in some regions using a laser so that through-holes 21 are created. Furthermore, the decorative layer 3' in the first region has been eroded in the region of the through-holes 21 so that through-holes 31 have been generated in the decorative layer 3'. In the second region, the mask layer has been eroded in some regions in order to generate through-holes 22, which are covered by the decorative layer 3'.

Figure 3:
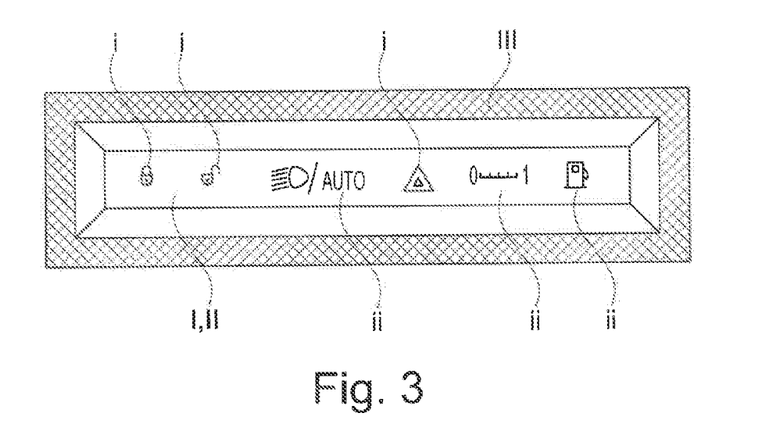
FIG. 3 shows a perspective view of a control unit.

FIG. 3 shows a perspective view of a control unit. The control unit is part of a vehicle interior trim part. The structure of the control unit corresponds substantially to the structure of the control unit of the previous figures. An information region (comprising regions I and regions II) is shown, in which three permanently visible symbols i are shown: a symbol which indicates door locking, a symbol which indicates door unlocking, and a symbol which indicates whether an warning hazard light is activated. Furthermore, symbols ii are shown in the information region which are only visible when they are back lit. These symbols ii are, for example, the signs for a switched-on dipped beam, for a fuel level indicator or a reserve tank light. The information region of FIG. 3 corresponds to a combination of the regions I and II shown in FIGS. 1 and 2. The control unit comprises illuminants which are arranged behind the symbols. A lighting element is arranged behind each symbol i, or ii. Each lighting element is controllable independently of the further lighting elements. The lighting elements are assigned to functions, so that, for example, the lighting element arranged behind the symbol i, which is designed in the form of a warning hazard light warning sign, lights up when the warning hazard light is switched on.

The permanently visible symbols i are permanently visible, because, as described in greater detail with reference to FIGS. 1 and 2, the through-holes 21 in the mask layer 2 are not covered by the decorative layer 3, and instead corresponding through-holes 31 are provided in the decorative layer.

The symbols ii that disappear when the lighting elements are switched off are not permanently visible, because, as described in greater detail with reference to FIGS. 1 and 2, the through-holes 21 in the mask layer 2 are covered by the decorative layer 3. In FIG. 3 the lighting elements behind the symbols ii are switched on so that the symbols ii are visible.

The regions I, II of the control unit are surrounded by a region III, which corresponds to the region III described in FIGS. 1 and 2.

Figure 4:
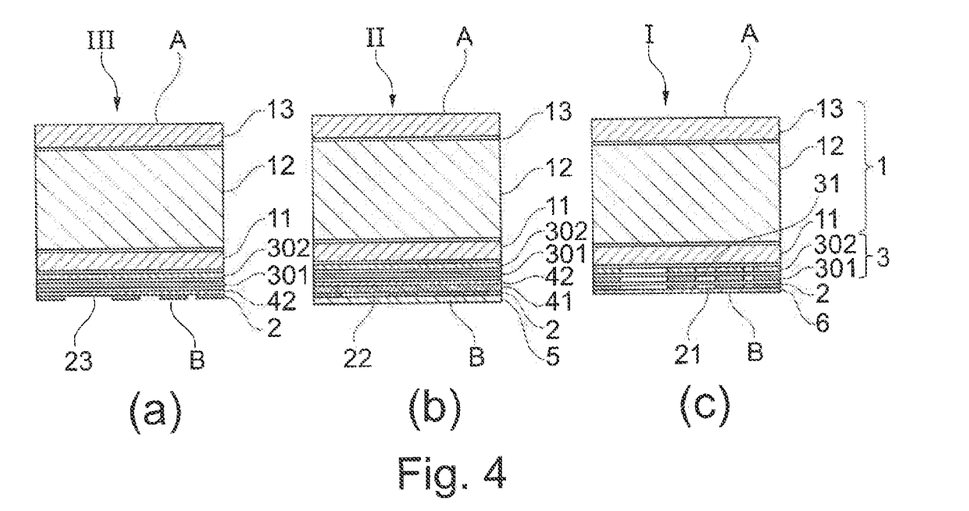
FIG. 4 shows a sectional view through regions of the control unit of FIG. 3.

FIG. 4 shows a sectional view through the regions I, II, III of a control unit according to one of the previous figures. FIG. 4 (*a*) shows the third region, FIG. 4 (*b*) shows the second region II, and FIG. 4 (*c*) shows the first region I. The front side, i.e., the visible side of the control unit, is denoted by "A", and the rear side of the control unit is denoted by "B".

All three regions have a cover layer 1. This cover layer 1 comprises three layers: a foil layer 11, a carrier layer 12 and a protective layer 13. The protective layer 13 is a PU clear lacquer, 0.6 mm, applied by means of the reaction injection molding (RIM) method. The protective layer offers protection against scratches and allows small radii. The carrier layer 12 is a transparent polycarbonate film (IML/FIM) so as to allow a rigidity of the parts. A glass-like appearance is also generated in this way. An optical depth effect is achieved by the thickness of the carrier layer of 10 mm. The foil layer 11 is a PC film with a thickness of 0.5 mm, which serves as a carrier and protection for the decoration components (tinted layer, layer with metallic appearance, screen-printed layers). The PC foil is suitable in particular for the thermoforming method and the IML/FIM process, so that a deformation of the component can take place in this way. In addition, an adhesion promoter layer can be applied in order to ensure the adhesion in IML/FIM.

The decorative layer 3 is arranged below the cover layer 1. The decorative layer comprises a metal layer 301 and/or a tinted color layer 302. The tinted color layer 302 is arranged between the metal layer 301 and the cover layer 1. The tinted color layer 302 is semi-transparent and offers a "dark chrome" effect. The tinted color layer can be tinted in different colors, in the present case for example in a dark blue. The tinted color layer 302 is laser-engraved in the first region so that it has through-holes 31 in order to allow ever-visible symbols in the region I.

The metal layer 301 is a metal-like layer, with low electrical conductivity, in order to be compatible with capacitive contact sensors. The metal layer 301 is semi-transparent in order to ensure a metallic appearance when it is not back lit. With backlighting, the metal layer 301 allows light to pass through in order to allow visible symbols. The metal layer is made of chromium and applied by means of PVD to the tinted color layer 302.

In the third region III and in the second region II, a translucent layer 42 is also arranged between the mask layer 2 and the metal layer 301. The translucent layer 42 is a dark, semi-transparent layer which is applied to the metal layer 301 by means of screen printing in order to reduce the contrast (in particular the visibility of the transition) between the opaque mask layer and the translucent decorative layer. In the second region, below the translucent layer 42, there is also arranged a further translucent layer 41. This has a light color and is semi-transparent. The translucent layer 41 serves in particular to protect the metal layer during the laser erosion of the mask layer 2 to generate the through-holes 22. Furthermore, the translucent layer can cause a scattering of the background lighting.

In all three regions I, II, III, the mask layer 2 is arranged beneath the decorative layer 3: in region I directly beneath the decorative layer 3, in region II adjacently to the translucent layer 41, and in region III adjacently to the translucent layer 42. The mask layer 2 is printed by means of screen printing onto the layer arranged thereabove correspondingly. The mask layer 2, in regions I and II, has through-holes 21, 22, which have been engraved into the mask layer 2 by means of laser erosion. In the third region the through-holes 23 were cut out during the screen printing.

In the second region a transparent or semi-transparent protective layer 5 for protecting the lasered edges and for protecting the metal layer 301 against ambient influences (in particular moisture, acids, oxygen) is arranged directly beneath the mask layer 2.

In the first region, a diffusor layer 6 is arranged directly beneath the mask layer 2. Said diffusor layer is pad printed and, for example, red or white in order to obtain a different color of the ever-visible symbols (here for example red for hazard warning light and white for door locking/unlocking).

The control unit also comprises capacitive sensors in order to allow an activation and/or adjustment by touching the surface A. The sensor system is not shown.

Figure 5:
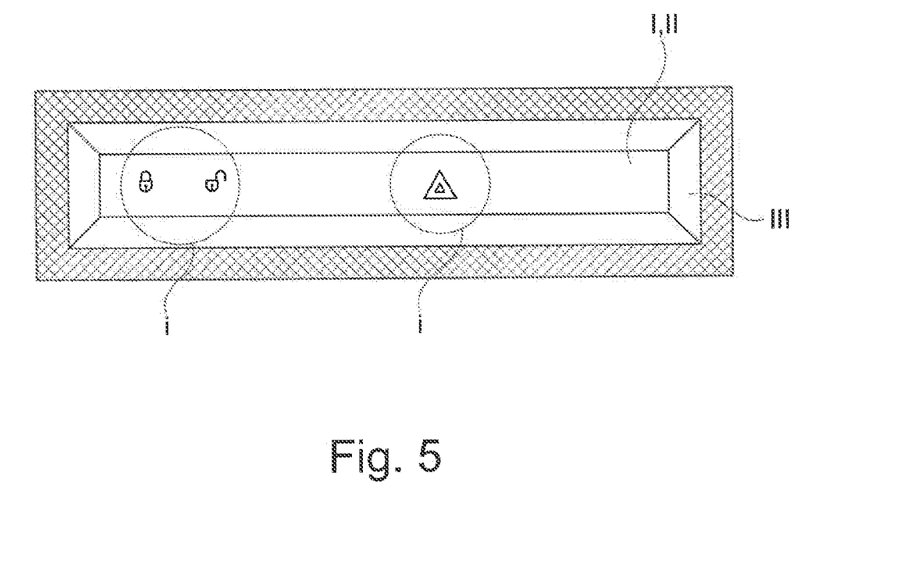
FIG. 5 shows a perspective view of the control unit of FIG. 3 with switched-off illuminants.

FIG. 5 shows the control unit of FIG. 4 in a state in which the illuminates are switched off. The disappearing symbols ii are not visible, whereas the permanently visible symbols i are visible.

Figure 6:
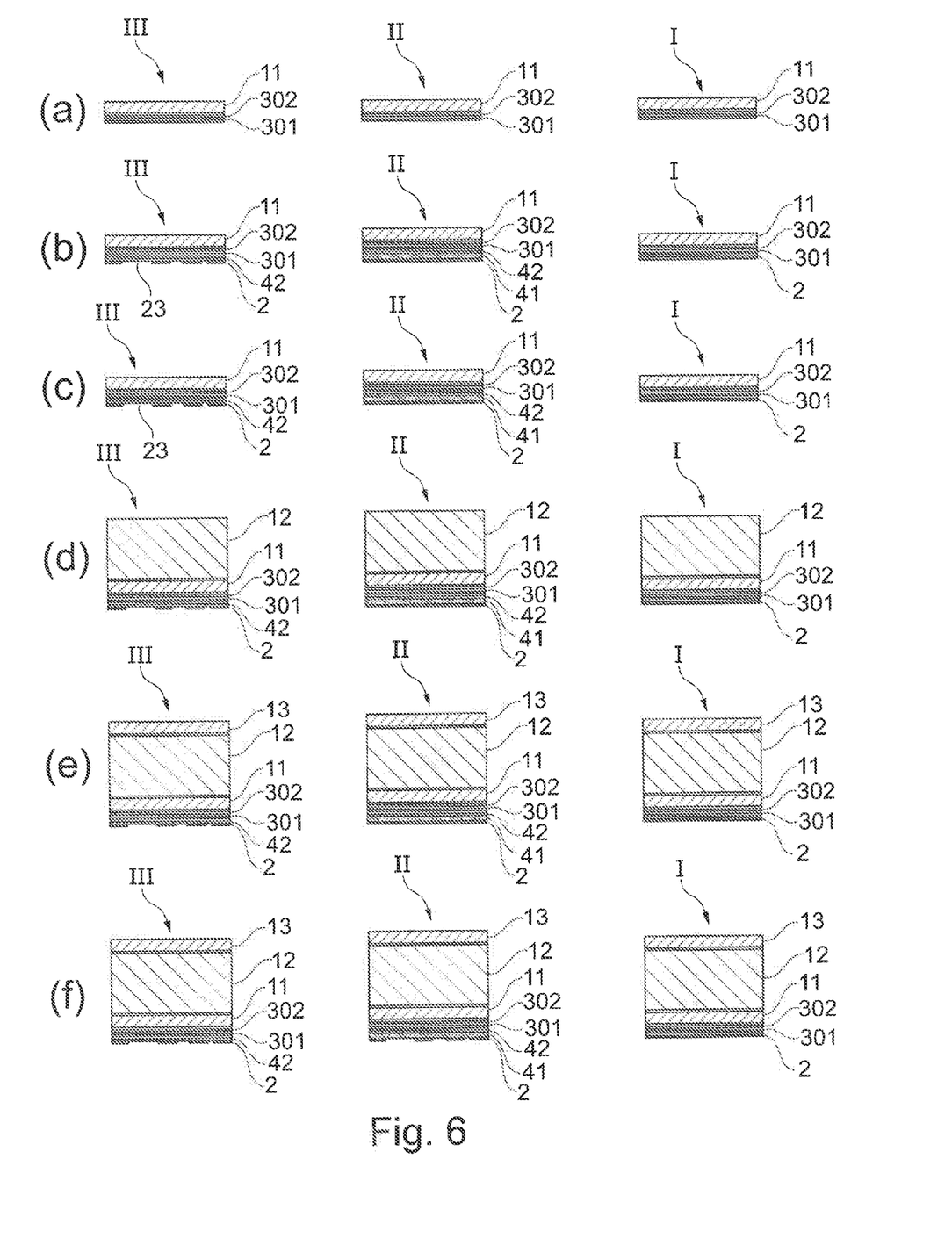
FIG. 6 shows an illustration of an exemplary production process of a control unit according to FIG. 4 or 5.

In FIG. 6, a process for producing a control unit as per the previous figures, in particular FIG. 3 or 5, is shown. Reference is made to the above description in respect of FIGS. 3 to 5. The foil layer 11 is provided in accordance with the above description and is printed with the tinted color layer 301 and with the metal layer 302, as shown in FIG. 6 (a). At this point of the method, the layered structure of the control unit is the same in all regions I-III. The printed foil is then trimmed into a desired shape. In a next method step (shown in FIG. 6 (b)), the translucent layer 42 in the second region and in the third region is printed onto a rear side of the metal layer 301 facing away from the cover layer. In the second region, the translucent layer 41 is printed onto a side of the translucent layer 42 facing away from the cover layer 1. The mask layer 2 is printed onto a rear side of the translucent layer 42 in the third region III onto a rear side of the translucent layer 41 in the second region II and onto a rear side of the metal layer 301 in the first region I. In the third region, cut-outs are provided so that through-holes 23 are created, whereas the mask layer is applied over the entire area in the first and in the second region I, II.

In a next method step (FIG. 6 (c)), the component can be per-shaped, for example under the action of heat or in a high-pressure method.

The per-shaped form can be fixed in a next method step (FIG. 6 (d)). For this purpose, a carrier layer 12 made of liquid plastic is sprayed onto a front side of the foil layer 11, preferably by means of FIM or IML, and cures so that the above-described carrier layer 12 is created. In a next method step (FIG. 6 (e)), a protective layer 13 can be applied to a front side of the carrier layer 11, preferably sprayed on, or can be applied by means of dipping. Through-holes 21, 22 are then removed from the mask layer 2 in the second region II (FIG. 6 (f)) and in the first region I (FIG. 6 (g)) using a laser. In the first region I, through-holes 31 are also generated in the metal layer 301 and in the tinted color layer 302 via laser erosion. In the next method step, the diffusor layer 6 is applied in the first region I to a rear side B of the mask layer 2, in particular also into the through-holes 21, by means of pad printing (FIG. 6 (h)). In the last step (FIG. 6 (i)), a protective layer 5 is applied to the rear side of the mask layer 2, covering the through-holes 22, by means of pad printing.

What is claimed is:

1. A control unit for a vehicle interior, the control unit comprising a visible side, for visibly facing toward the vehicle interior, and a rear side and further comprising:
   a transparent cover layer arranged on the visible side;
   an opaque mask layer; and
   a translucent decorative layer arranged between the transparent cover layer and the opaque mask layer, wherein the opaque mask layer and the translucent decorative layer each have at least one through-hole in a first region, wherein in the first region the at least one through-hole of the opaque mask layer and the at least one through-hole of the translucent decorative layer are aligned with each other, and wherein, in a second region, the opaque mask layer has at least one through-hole covered by the translucent decorative layer, wherein, in the first region, at least one of the at least one through-hole of the opaque mask layer or the at least one through-hole of the translucent decorative layer is formed and arranged in such a way that at least one symbol is permanently visible on the visible side of the control unit without requiring a backlighting of the control unit from the rear side, and wherein, in the second region, the at least one through-hole of the opaque mask layer is formed and arranged in such a way that at least one symbol is visible on the visible side of the control unit when backlighting the control unit.

2. The control unit according to claim 1, wherein, in a third region, the opaque mask layer has a plurality of through-holes, wherein the translucent decorative layer covers at least one through hole of the plurality of through-holes of the opaque mask layer, and wherein the third region surrounds the first region and the second region.

3. The control unit according to claim 2, wherein at least one of: i) at least one of the at least one through-hole of the opaque mask layer in the first region or the at least one through-hole of the opaque mask layer in the second region is formed by laser erosion, or ii) wherein, in the third region, at least one through-hole of the plurality of through-holes in the opaque mask layer is formed by screen printing.

4. The control unit according to claim 2, wherein at least one further translucent layer is arranged in at least one of the second region or the third region between the translucent decorative layer and the opaque mask layer.

5. The control unit according to claim 1, wherein the transparent cover layer comprises at least one of a foil layer, a carrier layer, or a protective layer.

6. The control unit according to claim 1, wherein the translucent decorative layer comprises at least one of a metal layer or a tinted color layer.

7. The control unit according to claim 1, wherein at least one of a light-permeable diffusor layer or a protective layer is arranged on a rear side of the opaque mask layer, and wherein the rear side faces away from the visible side.

8. A method for producing a control unit for a vehicle, the method comprising: providing a first foil having a front side and a rear side; printing a translucent decorative layer onto the rear side of the first foil; printing on at least a portion of an opaque mask layer; eroding at least a portion of the opaque mask layer; forming at least one through-hole in a first region of the opaque mask layer; forming at least one through-hole in a second region of the opaque mask layer; and eroding at least a portion of the translucent decorative layer by laser erosion, to form at least one through-hole in the translucent decorative layer that corresponds to the at least one through-hole in the first region of the opaque mask layer, wherein the translucent decorative layer is located between a transparent cover layer and the opaque mask layer, wherein, in the first region, at least one of the at least one through-hole of the opaque mask layer or the at least one through-hole of the translucent decorative layer is formed and arranged in such a way that at least one symbol is permanently visible on a visible side of the control unit without requiring backlighting of the control unit from the rear side, and wherein, in the second region, the at least one through-hole of the opaque mask layer is formed and arranged in such a way that at least one symbol is visible on the visible side of the control unit when backlighting the control unit.

9. The method according to claim 8, wherein printing of the translucent decorative layer is done by screen printing.

10. The method according to claim 8, wherein printing on at least a portion of the opaque mask layer is done by screen printing.

11. The method according to claim 8, wherein eroding of at least a portion of the opaque mask layer is done using laser erosion.

12. The method according to claim 8, wherein at least one of the at least one through-hole in the first region of the opaque mask layer or the at least one through-hole in the second region of the opaque mask layer is formed using a laser.

13. The method according to claim 8, wherein the opaque mask layer is applied across the entire first region, applied across the entire second region, and applied in a portion of a third region of the opaque mask layer, so that the opaque mask layer has on or more through-holes in the third region.

14. The method according to claim 13, wherein a diffusor layer is printed in the first region on a side of the opaque mask layer facing away from a visible side by pad printing.

15. The method according to claim 14, wherein a protective layer is applied on at least one of: i) a side of the opaque mask layer in at least one of the first region of the opaque mask layer, the second region of the opaque mask layer, or the third region of the opaque mask layer, ii) the side of the opaque mask layer facing away from the visible side, or iii) a side of the diffusor layer facing away from the visible side, wherein the protective layer is applied by pad printing.

16. A control unit for a vehicle interior the control unit comprising a visible side, for visibly facing toward the vehicle interior, and a rear side and further comprising:
a transparent cover layer arranged on the visible side;
an opaque mask layer; and
a translucent decorative layer arranged between the transparent cover layer and the opaque mask layer, wherein the opaque mask layer and the translucent decorative layer each have at least one through-hole in a first region, wherein in the first region the at least one through-hole of the opaque mask layer and the at least one through-hole of the translucent decorative layer are aligned with each other, wherein, in a second region, the opaque mask layer has at least one through-hole covered by the translucent decorative layer, wherein, in a third region, the opaque mask layer has a plurality of through-holes, wherein the translucent decorative layer covers at least one through hole of the plurality of through-holes, and wherein the third region surrounds the first region and the second region, wherein, in the first region, at least one of the at least one through-hole of the opaque mask layer or the at least one through-hole of the translucent decorative layer is formed and arranged in such a way that at least one symbol is permanently visible on the visible side of the control unit without requiring a backlighting of the control unit from the rear side, and wherein, in the second region, the at least one through-hole of the opaque mask layer is formed and arranged in such a way that at least one symbol is visible on the visible side of the control unit when backlighting the control unit.

17. The control unit according to claim 16, wherein at least one of: i) the at least one through-hole of the opaque mask layer in the first region or the at least one through-hole of the opaque mask layer in the second region is formed by laser erosion, or ii) wherein, in the third region, at least one through-hole of the plurality of through-holes in the opaque mask layer is formed by screen printing.

18. The control unit according to claim 16, wherein the transparent cover layer comprises at least one of a foil layer, a carrier layer, or a protective layer, wherein the transparent cover layer comprises at least one of a foil layer, a carrier layer, or a protective layer, wherein at least one further translucent layer is arranged in at least one of the second region or the third region between the translucent decorative layer and the opaque mask layer, wherein at least one of a light-permeable diffusor layer or a protective layer is arranged on a rear side of the opaque mask layer, and wherein the rear side faces away from the visible side.

* * * * *